United States Patent
Miura

(10) Patent No.: US 10,265,884 B2
(45) Date of Patent: Apr. 23, 2019

(54) KNEADER AND KNEADING METHOD

(71) Applicant: Kobe Steel, Ltd., Kobe-shi (JP)

(72) Inventor: Hodaka Miura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 627 days.

(21) Appl. No.: 14/771,336

(22) PCT Filed: Feb. 26, 2014

(86) PCT No.: PCT/JP2014/001013
§ 371 (c)(1),
(2) Date: Aug. 28, 2015

(87) PCT Pub. No.: WO2014/155965
PCT Pub. Date: Oct. 2, 2014

(65) Prior Publication Data
US 2016/0001463 A1 Jan. 7, 2016

(30) Foreign Application Priority Data

Mar. 27, 2013 (JP) ................................ 2013-066537

(51) Int. Cl.
*B29B 7/18* (2006.01)
*B29B 7/28* (2006.01)
(Continued)

(52) U.S. Cl.
CPC ................ *B29B 7/72* (2013.01); *B29B 7/183* (2013.01); *B29B 7/286* (2013.01); *B29B 7/46* (2013.01); *B29B 7/845* (2013.01); *B29B 7/82* (2013.01)

(58) Field of Classification Search
CPC .. B29B 7/46; B29B 7/72; B29B 7/183; B29B 7/283; B29B 7/82
(Continued)

(56) References Cited

U.S. PATENT DOCUMENTS 6,567,157 B1* 5/2003 Flagan ................. G01N 1/2247
356/335
7,595,360 B2* 9/2009 Sandstrom ............ B60C 1/0016
524/492
(Continued)

FOREIGN PATENT DOCUMENTS

CN 102530870 A 7/2012
CN 102873778 A 1/2013
(Continued)

OTHER PUBLICATIONS

JP 2006123272 Description Espacenet Machine Translation.*
(Continued)

*Primary Examiner* — Walter D. Griffin
*Assistant Examiner* — Shuyi S. Liu
(74) *Attorney, Agent, or Firm* — Oblon, McClelland, Maier & Neustadt, L.L.P.

(57) ABSTRACT

A kneader includes a kneader main body including a casing including a kneading chamber and a kneading portion that is disposed in the casing and kneads a material in the kneading chamber. The material supplied to the kneading chamber includes a resin material, an inorganic additive added to the resin material, and a coupling agent for enhancing affinity of the inorganic additive for the resin material. The kneader further includes a kneading monitoring portion that monitors a kneading state of the material by detecting a reaction product that is generated by a reaction between the coupling agent and the inorganic additive.

5 Claims, 1 Drawing Sheet

(51) Int. Cl.
*B29B 7/46* (2006.01)
*B29B 7/72* (2006.01)
*B29B 7/82* (2006.01)
*B29B 7/84* (2006.01)

(58) Field of Classification Search
USPC .......................................................... 366/97
See application file for complete search history.

(56) References Cited

U.S. PATENT DOCUMENTS

| | | | |
|---|---|---|---|
| 2002/0016403 A1 | 2/2002 | Pontecorvo | |
| 2002/0094681 A1* | 7/2002 | Armbrust | C23C 16/52 438/680 |
| 2011/0222364 A1 | 9/2011 | Yoshida et al. | |
| 2013/0018141 A1 | 1/2013 | Oda et al. | |

FOREIGN PATENT DOCUMENTS

| | | | |
|---|---|---|---|
| JP | 2002 46123 | | 2/2002 |
| JP | 2006-123272 A | | 5/2006 |
| JP | 2006123272 A | * | 5/2006 |
| JP | 3806345 | | 8/2006 |
| JP | 2006 337342 | | 12/2006 |
| JP | 2007 216471 | | 8/2007 |
| JP | 2010-89423 A | | 4/2010 |
| JP | 2010 216952 | | 9/2010 |
| JP | 4568785 | | 10/2010 |
| JP | 2010-271606 A | | 12/2010 |
| JP | 2012-121942 A | | 6/2012 |
| JP | 2012 251068 | | 12/2012 |
| JP | 2012 255048 | | 12/2012 |
| JP | 2012251068 A | * | 12/2012 |
| JP | 2012251068 A | * | 12/2012 |
| JP | 2012255048 A | * | 12/2012 |

OTHER PUBLICATIONS

JP 2012255048 Description Espacenet Machine Translation.*
JP 2012251068 Description Espacenet Machine Translation.*
International Search Report dated Apr. 8, 2014 in PCT/JP2014/001013 filed Feb. 26, 2014.
English translation of the International Preliminary Report on Patentability and Written Opinion dated Oct. 8, 2015 in PCT/JP2014/001013 filed Feb. 26, 2014.
Extended European Search Report dated Oct. 5, 2016 in Patent Application No. 14774747.1.

* cited by examiner

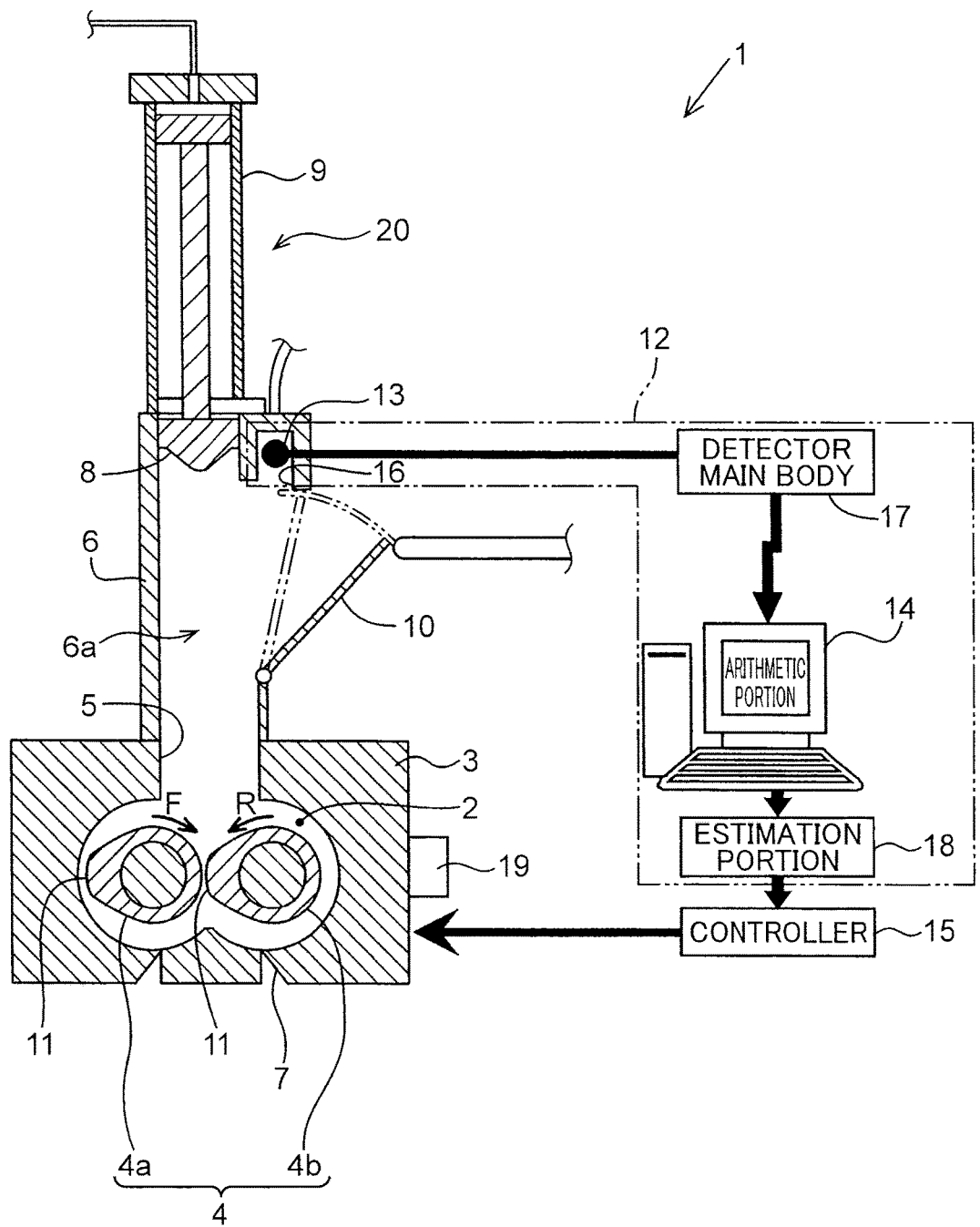

KNEADER AND KNEADING METHOD

TECHNICAL FIELD

The present invention relates to a kneader and kneading method. Particularly the present invention relates to a kneader and kneading method for kneading a resin material mixed with silica as a reinforcing agent and a silane coupling agent.

BACKGROUND ART

Generally, when producing a rubber good such as a tire, a step of adding a filling material (filler) to a rubber material (crude rubber) used as an ingredient of the rubber good is carried out first. This filling material is mixed with a reinforcement component such as carbon black or silica. However, recently in most cases silica is used for the purpose of enhancing the strength of a rubber material.

Also, in some cases a reinforcement component such as silica is added to a synthetic resin material, such as polyolefin resin including polyethylene (PE) and polypropylene (PP), polyamide resin including nylon, or polyester resin including polyethylene-telephthalate (PET).

However, silica, which is an inorganic material, does not easily bind chemically to an organic material such as a rubber material or a synthetic resin material by itself (hereinafter, both a rubber material and a synthetic resin material are simply referred to as "resin material"). For this reason, a silane coupling agent is added to the resin material along with silica. The silane coupling agent enables easy chemical binding between the silica and the resin material by providing an organic functional group to a surface of the silica.

For example, Patent Document 1 discloses a method of kneading a high polymer material such as rubber containing silica and a silane coupling agent, by means of a batch-wise kneader. Patent Document 2 discloses a heimetically closed rubber kneader provided with a dust collecting duct for attracting a material scattered in a hopper of the kneader.

Incidentally, when kneading with a silane coupling agent as described above, this kneading needs to be performed sufficiently in order to allow the silane coupling agent to react with silica reliably. Thus, when this kneading is performed by the kneaders described in Patent Document 1 and Patent Document 2. the kneading is performed for enough extra time based on the past results, in order to cause the silane coupling agent to react with silica reliably.

However, kneading by adding the silane coupling agent to the resin material might change the state of reaction of the silane coupling agent, depending on the type of resin material used, how the materials could be shifted to one side, a temperature distribution in the kneader, or the like. This leads to significant, more-than-expected fluctuation of the kneading time and kneading conditions. Therefore, in order to knead the material sufficiently to obtain a reliable reaction of the silane coupling agent, it is desirable to accurately understand how well the resin material is kneaded inside the kneader, i.e., how much the silane coupling agent is reacted.

In response to such a demand, the kneaders described in Patent Document 1 and Patent Document 2 are not designed to actually enable understanding how well the resin material is kneaded in each kneader. Therefore, when kneading with a silane coupling agent is performed using the kneaders described in Patent Document 1 and Patent Document 2, the kneading operation may end before the silane coupling agent is not yet reacted completely, which is likely to cause variations in quality of the resin material in each batch-based kneading operation due to the insufficient action of the silane coupling agent.

In this regard, what is considered is removing the resin material after the end of kneading using the above-mentioned kneaders, and then analyzing the quality of the resin material offline. In such process, however, the next batch cannot be kneaded until the results of the analysis of the current batch are available, resulting in a reduction of productivity. In addition, the kneaders of Patent Document 1 and Patent Document 2 each sometimes require a long time to knead the material. For instance, these kneaders are likely to continue an unnecessary kneading operation even after the reaction of the silane coupling agent is completed, which is inefficient and likely to lower productivity significantly.

CITATION LIST

Patent Literature

Patent Document 1: Japanese Patent No. 4568785
Patent Document 2: Japanese Patent No. 3806345

SUMMARY OF THE INVENTION

An object of the present invention is to be able to realize reliable monitoring of a reaction rate between an inorganic additive functioning as a reinforcing agent and a coupling agent when kneading a resin material mixed with the inorganic additive and the coupling agent, and to thereby realize the improvement of both quality stability and productivity.

A kneader of the present invention is provided with: a kneader main body that has a casing having a kneading chamber to which is supplied a material containing a resin material, an inorganic additive added to the resin material, and a coupling agent for enhancing affinity of the inorganic additive for the resin material, and a kneading portion for kneading the material in the kneading chamber; and a kneading monitoring portion that monitors a kneading state of the material by detecting a reaction product that is generated by a reaction between the coupling agent and the inorganic additive.

BRIEF DESCRIPTION OF DRAWINGS

FIG. 1 is a diagram showing the entire configuration of a kneader according to an embodiment of the present invention.

DESCRIPTION OF EMBODIMENTS

A kneader 1 and a kneading method according to an embodiment of the present invention are described hereinafter with reference to the drawing.

The kneader 1 shown in FIG. 1 has a heimetically closed kneader main body 20 (a batch-wise hermetically closed kneader), a kneading monitoring portion 12 for monitoring a kneading state of a material kneaded in the kneader main body 20, and a controller 15 for controlling the operation of the kneader main body 20.

A kneaded material (resin material) kneaded by this kneader main body 20 can be a material obtained by adding, to a matrix (main component) that contains a synthetic resin, such as rubber including BR(butadiene rubber) and SBR (styrene butadiene rubber), polyolefin resin including PE and PP, polyamide resin including nylon, or polyester resin including PET, an inorganic additive functioning as a reinforcing agent, such as silica or carbon black, and a coupling agent that binds this inorganic additive to the matrix. More specifically, a material obtained by adding various additives (e.g., additives such as a vulcanizing agent, a vulcanizing auxiliary agent, or a reinforcing agent) to raw rubber (crude rubber) used in a tire, polyethylene resin, or nylon resin such as PA66, is used as the kneaded material. In addition, silica, carbon black or the like is used as the inorganic additive, and a silane coupling agent or the like is used as the coupling agent.

In the following example, rubber is used as the resin material, silica as the inorganic additive, and a silane coupling as the coupling agent.

As shown in FIG. 1, the kneader main body 20 comprises a casing 3 having a kneading chamber 2 therein, a kneading portion 4 that is inserted into this casing 3 and kneads a material in the kneading chamber 2, and a temperature regulator 19, such as a heater, for changing the temperature of the casing 3 to regulate the temperature of the kneading chamber 2.

The inside of the casing 3 (barrel) is formed from metal into a hollow and supported by a metal support. The kneading chamber 2 (chamber) having a cross section in the shape of spectacle holes is formed in the casing 3. A pair of kneading rotors 4a, 4b of the kneading portion 4, described hereinafter, is stored in this kneading chamber 2. A material supply port 5 that vertically penetrates an upper part (upper wall) of the casing 3 is formed on the upper side of the casing 3. Further, a material supply portion 6 for supplying a material into the kneading chamber 2 through this material supply port 5 is provided on the material supply port 5. On the lower side of the casing 3, on the other hand, a material outlet 7 that vertically penetrates a lower part (lower wall) of the casing 3 is formed. The material inside the kneading chamber 2 (the material that is already kneaded) is discharged to the outside of the kneading chamber 2 through the material outlet 7.

The material supply portion 6 is a long cylindrical member. The material supply portion 6 is provided vertically on the casing 3, in a standing manner. A material stored in the material supply portion 6 is supplied to the kneading chamber 2 by being pushed downward toward the kneading chamber 2. A material before kneading (unkneaded material) and a floating weight 8 that pushes this material toward the kneading chamber 2 (downward) are stored in the material supply portion 6. This floating weight 8 is equipped in the material supply portion 6 in such a manner as to be able to move vertically. The floating weight 8 is moved vertically by a cylinder portion 9 which is described below. A side surface of the material supply portion 6 is provided with a material supply door 10 to feed the material into the material supply portion 6. The cylinder portion 9 for pushing down the floating weight 8 provided inside the material supply portion 6 is provided above the material supply portion 6.

The kneading portion 4 has a pair of kneading rotors 4a, 4b. On the inside of the kneading chamber 2, the kneading rotors 4a, 4b are disposed horizontally so that shaft centers thereof are aligned parallel to each other. Using a motor, not shown, the pair of kneading rotors 4a, 4b are driven to rotate about the axes thereof directed horizontally. These kneading rotors 4a, 4b are designed to rotate anisotropically. In case of the kneading rotors 4a, 4b shown in FIG. 1 in which the kneading rotor on the left-hand side of the page space of FIG. 1 is the "first rotor 4a" and the kneading rotor on the right-hand side of the page space of FIG. 1 the "second rotor 4b," the first rotor 4a rotates in an F direction, and the second rotor 4b in an R direction opposite to the direction of rotation of the first rotor 4a. One line of kneading blade 11 is formed on each of outer circumferential surfaces (surfaces) of the kneading rotors 4a, 4b in such a manner as to protrude away from (radially outward) the center of axis of rotation of each kneading rotor. When the kneading rotors 4a, 4b rotate, the kneading blades 11 rotate in the kneading chamber 2, scraping the kneaded material in the kneading chamber 2, and thereby applying shear force to the kneaded material (resin material). In this manner, the kneaded material in the kneading chamber 2 can be kneaded.

Incidentally, in a case where the kneader main body 20 described above kneads a kneaded material containing silica (the inorganic additive) and a silane coupling agent (the coupling agent), it is preferred that the kneading state of the kneaded material be monitored accurately in order to realize the improvement of quality stability and productivity of the resultant kneaded material. In other words, it is preferred that a reaction rate between the inorganic additive and the coupling agent be figured out accurately.

Thus, the kneader 1 of the present embodiment has the kneading monitoring portion 12 that monitors the kneading state of the kneaded material by detecting a reaction product generated by a reaction between the silane coupling agent and the silica. In a case where a coupling reaction is induced between the silane coupling agent and the silica, an alcohol such as ethanol or methanol, carboxylic acid such as acetic acid, or the like, which is generated as a by-product (reaction product) corresponds to this reaction product.

The kneading monitoring portion 12 has a detector 13 that detects a reaction product generated by a reaction between the silane coupling agent and the silica, an arithmetic portion 14, which is a calculator that calculates a reaction rate of the silane coupling agent (the kneading state of the material) based on the amount of the reaction product detected by the detector 13, and an estimation portion 18 that estimates the kneading state of the material by using the calculated reaction rate.

The kneader 1 of the present embodiment also has a controller 15 that controls the operation of the kneader main body 20, i.e., the operation of at least the kneading portion 4 (the kneading rotors 4a, 4b, to be precise).

As shown in FIG. 1, the detector 13 detects a concentration of a gas-phase reaction product that is generated from the kneading chamber 2 provided in the kneader main body 20. A detector that is configured to detect at least one of the following gasses of ethanol, methanol, and acetic acid is adopted as the detector 13, and therefore, for example, a semiconductor gas sensor capable of detecting a concentration of an alcohol, carboxylic acid or the like is used. The detector 13 shown in the diagram is installed slightly above the material supply door 10 and on the inside of the material supply portion 6. Specifically, the detector 13 is installed in an upper part of an internal space 6a of the vertically long, cylindrical material supply portion 6 (a dust collecting duct 16 of the kneader main body 20 in the diagram). The internal space 6a of the material supply portion 6 is hermetically isolated from the outside and can accumulate the gas-phase reaction product. Therefore, when the gas-phase reaction product generated from the kneading chamber 2 moves to the upper side of the internal space 6a of the material supply portion 6 and accumulates in the upper part of the internal space 6a, the detector 13 provided on the inside of the material supply portion 6 can detect this reaction product.

Note that the position to install the detector 13 is not limited to the upper part of the internal space of the material supply portion 6 shown in FIG. 1. For example, the detector 13 may be provided in a different position in the internal space 6a of the material supply portion 6. Alternatively, in case of providing piping or the like for sampling gas in the kneading chamber 2 or the material supply portion 6, the detector 13 may be provided at a leading end of this piping for sampling gas.

The concentration of the gas-phase reaction product that is detected by the detector 13 is converted into a signal by a detector main body 17 (e.g., an ethanol detector or the like). This signal is sent to the arithmetic portion 14 configured by a personal computer or the like. In addition to the ethanol detector, a detector for detecting other gases can be adopted as the detector main body 17.

Based on the concentration of the reaction product that is detected by the detector 13 (the signal obtained from the detector main body 17, to be precise), the arithmetic portion 14 calculates a "reaction rate of the silane coupling agent," which indicates how much of the silane coupling agent added to the material induces a reaction. More specifically, a "reaction rate of the silane coupling agent (kneading progress of the kneaded material) with respect to the detected concentration of the reaction product" is examined beforehand by experiment or the like and then data on this reaction rate is stored in the arithmetic portion 14. Using the stored data on the reaction rate and the concentration of the reaction product that is detected by the detector 13 during the kneading operation, the arithmetic portion 14 calculates the reaction rate of the silane coupling agent.

The actual kneading state of the material, or, for example, how much the material is kneaded, can be estimated by the estimation portion 18 using the "reaction rate of the silane coupling agent" calculated by the arithmetic portion 14. Note that the estimation portion 18 may be included in one computer along with the arithmetic portion 14.

The controller 15 controls the operation of the kneader main body 20 based on the reaction rate calculated by the arithmetic portion 14, or, in other words, by using the kneading state of the material that is estimated by the estimation portion 18 of the kneading monitoring portion 12.

In other words, the estimation portion 18 determines whether the reaction rate calculated by the arithmetic portion 14 exceeds a certain threshold or not. Depending on the result of the determination made by the estimation portion 18, the controller 15 controls the operating condition to operate or stop the kneader main body 20. Such control leads to a constant reaction rate in kneaded materials throughout the batches, enabling to maintain the stability of the quality of kneading throughout the batches. In addition, kneading the material based on the reaction rate calculated by the arithmetic portion 14 can resolve such problems as kneading for extra time over required time or not being too short for kneading time. Therefore, a productive kneading work can be performed without wasting any kneading time.

It should be noted that the controller 15 can send a control signal depending on the calculated reaction rate to the kneader main body 20 to thereby change the rotational speed of the kneading rotors 4a, 4b or use the temperature regulator 19 to change the temperature of the casing 3 of the kneader main body 20. Such a configuration can adjust the rotational speed of the kneading rotors 4a, 4b or use the temperature regulator 19 to adjust the temperature of the kneading chamber 2. As a result, the operation of the kneader main body 20 can be controlled in more detail, and the kneading state of the material can be controlled closely and with a high degree of accuracy.

Next is described a method for kneading a material mixed with silica and silane coupling agent by using the kneader 1 described above, i.e., the kneading method of the present invention.

The kneading method of the present invention is a kneading method that uses the kneader main body 20, which has the casing 3 having the kneading chamber 2 therein and the kneading portion 4 inserted into the casing 3 and kneading a material in the kneading chamber 2, to knead a resin material, silica for reinforcing this resin material, and a silane coupling agent for enhancing affinity of the silica for the resin material. The method is characterized by kneading the material while monitoring a kneading state of the material by detecting a reaction product generated by a reaction between the silane coupling agent and the silica.

Specifically, the kneading method of the present invention is implemented by the following procedure.

In other words, the material supply door 10 described above is opened, and a kneaded material mixed with a resin material, silica, and a silane coupling agent is supplied to the material supply portion 6. Next, the kneaded material supplied to the inside of the material supply portion 6 is pushed down by using the floating weight 8, and the material stored in the material supply portion 6 is sent to the inside of the kneading chamber 2 disposed under the material supply portion 6. Subsequently, the pair of kneading rotors 4a, 4b of the kneading portion 4 is rotated, whereby the kneaded material sent to the inside of the kneading chamber 2 is kneaded.

During this kneading operation, a reaction product of an alcohol or carboxylic acid is generated within the kneaded material due to a reaction between the silane coupling agent and the silica. This generated reaction product is vaporized by heat of the kneading chamber 2, and the resultant vaporized, gas-phase reaction product rises toward the internal space 6a of the material supply portion 6 from the material supply port 5. The concentration of this reaction product accumulated in the upper part of the internal space 6a is detected by the detector 13 of the kneading monitoring portion 12.

A signal related to the concentration of the reaction product that is detected by the detector 13 is sent to the arithmetic portion 14 via the detector main body 17 (e.g., an ethanol detector or the like). The arithmetic portion 14 calculates the reaction rate of the silane coupling agent based on the concentration of the reaction product. Using the reaction rate of the silane coupling agent that is calculated in this manner, the estimation portion 18 estimates the kneading progress of the kneaded material, which is the kneading state of the kneaded material.

For instance, when the reaction rate calculated by the arithmetic portion 14 exceeds a certain threshold, the estimation portion 18 determines that a sufficient reaction of the silane coupling agent (coupling reaction) is obtained. At this moment, based on the determination result of the estimation portion 18, the controller 15 sends a command signal to the kneader main body 20 and controls the kneader main body 20 to end the kneading operation. When, on the other hand, the calculated reaction rate does not exceed the certain threshold, the estimation portion 18 determines that the reaction of the silane coupling agent is not quite completed. At this moment, based on the determination result of the estimation portion 18, the controller 15 controls the kneader main body 20 to continue the kneading operation. In this manner, a constant reaction rate can be obtained in kneaded materials throughout the batches, resulting in uniform quality of finished kneading in the batch-based kneading operation. Therefore, the stability of the quality throughout the batches can be maintained.

Moreover, by controlling the reaction rate not to exceed the certain threshold, extra time is not needed to perform the kneading operation. Consequently, any kneading time is not wasted, and a productive kneading operation can be performed.

Note that, depending on the calculated reaction rate, the controller 15 can send to the kneader main body 20 a signal for changing the rotational speed of the kneading rotors 4a, 4b or changing the temperature of the casing 3 of the kneader main body 20 by means of the temperature regulator 19. Such a configuration enables more detailed adjustment of the operating condition of the kneader main body 20 by means of the kneading state of the kneaded material that is estimated by the estimation portion 18 of the kneading monitoring portion 12. Consequently, the kneading state of the kneaded material can be controlled accurately.

According to the kneader 1 and the kneading method described above, when kneading a rubber material (the kneaded material) mixed with silica as a reinforcing agent and a silane coupling agent, the reaction rate between the silica and the silane coupling agent can be monitored accurately. Therefore, a constant reaction rate can be obtained in the resultant kneaded materials throughout the batches, enabling to maintain the stability of the quality throughout the batches. In addition, problems such as taking extra time to knead the material can be solved. Therefore, a productive kneading operation can be performed without wasting any kneading time. Consequently, the improvement of both quality stability and productivity can be realized.

The embodiment disclosed herein should be construed as merely illustrative and not restrictive in all of the aspects thereof. Particularly, in the embodiment disclosed herein, although not explicitly disclosed, matters such as the operating conditions/operational provisions, various parameters, and the sizes, weights and volumes of the components do not depart from the scope of the invention that is normally implemented by a person skilled in the art, and values that can easily be assumed by an ordinary person skilled in the art are adopted as these matters.

For example, the embodiment has illustrated a hermetically closed kneader as the kneader of the present invention, but it is perfectly acceptable to apply the technology of the invention of the present application to a continuous kneader.

The use of silica as the inorganic additive and a silane coupling agent as the coupling agent is also illustrated in the embodiment. However, a reinforcing agent such as carbon black may be used as the inorganic additive, and a coupling agent other than a silane coupling agent may be used.

In addition, the embodiment illustrates the example in which the kneading portion 4 for kneading the material in the kneading chamber 2 has the pair of kneading rotors 4a, 4b; however, the present invention is not limited to this example. As long as the material in the kneading chamber can be kneaded, a kneading portion of any type can be adopted. For example, a kneading portion with a screw is used as the kneading portion of the present invention.

Note that the specific embodiment described above mainly includes the invention having the following configurations.

The kneader of the present embodiment is provided with: a kneader main body that has a casing having a kneading chamber to which is supplied a material containing a resin material, an inorganic additive added to the resin material, and a coupling agent for enhancing affinity of the inorganic additive for the resin material, and a kneading portion for kneading the material in the kneading chamber; and a kneading monitoring portion that monitors a kneading state of the material by detecting a reaction product that is generated by a reaction between the coupling agent and the inorganic additive.

It is preferred that the kneading monitoring portion have: a detector that detects the reaction product that is generated by a reaction between the coupling agent and the inorganic additive; a calculator that calculates a reaction rate of the coupling agent based on the amount of the reaction product detected by the detector; and an estimation portion that estimates the kneading state of the material by using the calculated reaction rate.

It is preferred that the kneader be further provided with a controller that controls operation of the kneader main body based on the kneading state of the material monitored by the kneading monitoring portion.

Preferably, the kneader further has a controller for controlling operation of the kneader main body, wherein the kneading monitoring portion may have a detector that detects a reaction product that is generated by a reaction between the coupling agent and the inorganic additive, a calculator that calculates a reaction rate of the coupling agent based on the amount of the reaction product detected by the detector, and an estimation portion that estimates the kneading state of the material by using the calculated reaction rate, and wherein the controller may control the operation of the kneader main body based on the kneading state of the material that is monitored by the kneading monitoring portion.

It is preferred that the inorganic additive be silica for reinforcing the resin material, that the coupling agent be a silane coupling agent for enhancing affinity of the silica for the resin material, and that the detector be configured to detect at least one of the following gasses: ethanol, methanol, and acetic acid which are generated by a reaction between the silica and the coupling agent.

On the other hand, a kneading method of the present invention is a kneading method for kneading a resin material, an inorganic additive added to the resin material, and a coupling agent for enhancing affinity of the inorganic additive for the resin material by using a kneader that includes a casing having a kneading chamber therein, and a kneading portion that kneads a material in the kneading chamber, the kneading method including kneading the material while monitoring a kneading state thereof by detecting a reaction product generated by a reaction between the coupling agent and the inorganic additive.

The kneader and the kneading method according to the embodiment described above are capable of enabling reliable monitoring of a reaction rate between an inorganic additive functioning as a reinforcing agent and a coupling agent when kneading a resin material mixed with the inorganic additive and the coupling agent, and thereby realizing the improvement of both quality stability and productivity.

The invention claimed is:
1. A kneader, comprising:
a kneader main body that has: a casing defining a hermetically sealed internal space having a kneading chamber in which a material is kneaded, the material generating a gaseous reaction product while being kneaded; a kneading portion for kneading the material in the kneading chamber; and
a kneading monitoring portion that monitors a kneading state of the material in the kneading chamber by detecting the gaseous reaction product generated in the kneading chamber, and including:
- a detector which is provided in the hermetically sealed internal space of the kneader, and detects an amount of the gaseous reaction product generated in the kneading chamber,
- a calculator which is provided outside of the casing and calculates a reaction rate of the material based on the amount of the gaseous reaction product, and
- an estimation portion which is provided outside of the casing, and estimates a kneading state of the material by using the calculated reaction rate, and
- a controller adapted to control the operation of the kneading portion based on the kneading state of the material estimated by the estimation portion.

2. The kneader according to claim 1, wherein the detector is configured to detect at least one of the following gasses: ethanol, methanol, and acetic acid.

3. A kneading method for kneading a material including a resin material, an inorganic additive added to the resin material, and a coupling agent for enhancing affinity of the inorganic additive for the resin material by using a kneader that includes a casing defining a hermetically sealed internal space having a kneading chamber in which the material is kneaded, and a kneading portion for performing an operation of kneading the material in the kneading chamber, the kneading method including:

kneading the material in the kneading chamber while monitoring a kneading state of the material by:

detecting an amount of a gaseous reaction product generated by a reaction between the coupling agent and the inorganic additive in the kneading chamber by a detector provided in the hermetically sealed internal space;

calculating a reaction rate of the material based on the amount of the gaseous reaction product by a calculator provided outside of the casing;

estimating a kneading state of the material by using the calculated reaction rate by an estimation portion provided outside of the casing, and controlling the operation of the kneading portion based on the kneading state of the material estimated by the estimation portion.

4. A kneading method for kneading a material including a resin material, an inorganic additive added to the resin material, and a coupling agent for enhancing affinity of the inorganic additive for the resin material by using a kneader that includes a casing defining a hermetically sealed internal space having a kneading chamber in which the material is kneaded, and a kneading portion for performing an operation of kneading the material in the kneading chamber, the kneading method including: kneading the material in the kneading chamber; and monitoring a kneading state of the material being kneaded by: detecting an amount of a gaseous reaction product generated in the kneading chamber by a reaction between the coupling agent and the inorganic additive, at a location in the hermetically sealed internal space of the casing above the kneading chamber.

5. The method according to claim 4, wherein the inorganic additive is silica for reinforcing the resin material, the coupling agent is a silane coupling agent for enhancing affinity of the silica for the resin material, and a detector is configured to detect at least one of the following gasses: ethanol, methanol and acetic acid.

* * * * *